United States Patent [19]
Häfner

[11] Patent Number: 5,209,121
[45] Date of Patent: May 11, 1993

[54] PRESSURE SENSOR
[75] Inventor: Hans W. Häfner, Aichach-Walchshofen, Fed. Rep. of Germany
[73] Assignee: Pfister Messtechnik GmbH, Augsburg, Fed. Rep. of Germany
[21] Appl. No.: 733,531
[22] Filed: Jul. 22, 1991
[30] Foreign Application Priority Data
Jul. 24, 1990 [DE] Fed. Rep. of Germany ....... 4023420
[51] Int. Cl.⁵ .......................... G01L 7/08; G01L 9/06
[52] U.S. Cl. ........................... 73/727; 73/721; 338/4
[58] Field of Search ............. 73/720, 721, 726, 727, 73/708, 756, 862.65; 338/4
[56] References Cited
U.S. PATENT DOCUMENTS 3,389,362  6/1968  McLellan ........................ 73/720
3,611,797 10/1971  Pugnaire ........................ 73/720
4,017,819  4/1977  Pien ........................ 73/862.65
4,864,271  9/1989  Yajima ........................ 338/4

FOREIGN PATENT DOCUMENTS
1447317 6/1966 France .
61-88120 5/1986 Japan .
1065192 4/1967 United Kingdom .

Primary Examiner—Donald O. Woodiel
Attorney, Agent, or Firm—Armstrong, Westerman, Hattori, McLeland & Naughton

[57] ABSTRACT

A pressure sensor Comprising a disk-type base part having a preferably central opening spanned at one end by a surface-type pressure transducer, a pressure receiving part having a diaphragm arranged at distance from the other end side of said opening and integrally formed with a rigid ring having the same peripheral dimensions as the disk-type base part and being connected thereto. A distance holder is provided between the diaphragm and the pressure transducer fully transmitting any deformation of the diaphragm to the pressure transducer. Such a pressure transducer may be manufactured by a simple and cost-effective procedure with the various elements formed of ceramic, sintered and combined.

3 Claims, 1 Drawing Sheet

PRESSURE SENSOR

BACKGROUND OF THE INVENTION

1. Field of the Invention

The invention relates to a pressure sensor having pressure transmission capability and a method for manufacturing such sensors.

2. Description of the Related Art

British Patent No. 1,065,192 discloses a pressure sensor comprising a pot-type metal housing in which a first chamber is formed by a diaphragm assembly comprising a solid disk of relatively small diameter surrounded by a thin metal diaphragm, the diaphragm assembly limiting the first chamber in which a pressure transducer is placed surrounded by liquid filled in the first chamber. A second diaphragm assembly is fixedly attached to an annular ring that in turn is fixedly attached to the housing by screws. Resilient 0-rings seal mating surfaces between the ring and the housing. The second diaphragm assembly comprises a solid disk of a diameter much larger than that of the disk of the first diaphragm assembly and is surrounded by a thin metal diaphragm member. A distance stud connects the large disk with the small disk for direct force transmission. This known pressure sensor is of complex design and difficult and expensive to be manufactured.

JP 61-88120 A in Patents Abstracts of Japan P-495, Sep. 9, 1986 Vol. 10/No. 264 discloses a pressure transducer comprising an annular supporting body having a thin diaphragm rigidly fixed to one end surface. A pressure transmitting rod is fitted to the opposite side of the pressure receiving surface. The diaphragm, the supporting body, and the transmission rod are made of ceramics and are joined and adhered with powder glass. One end of a cantilever including a strain gauge is adhered to the supporting body with glass and the free end is contacted with the rod without being fixed. The cantilever constitutes a strain gauge by selectively diffusing impurity into a single crystal silicone substrate. By such a design the strain gauge is protected against contamination due to a medium the pressure of which is to be detected. No pressure transmission capability is disclosed.

French Patent No. 1,447,317 discloses a pressure sensor comprising a metal block provided with an inlet for pressurized fluid, an outer peripheral surface of said block being provided with a threading for having screwed thereon an annular ring spanned by a first diaphragm of large diameter. A second metal ring is in turn screwed to the first metal ring and is spanned by a second diaphragm provided with a resistor bridge. A force transmission stud extends between the two diaphragms for direct force transmission therebetween. The threaded connections are subject to leakage; furthermore, it is extremely difficult to exactly adjust the distance between the two diaphragms and bridge said force transmission rod. A similar sensor has been disclosed in European Patent Application No. 0 145 146.

U.S. Pat. No. 4,864,271 discloses pressure sensors made of ceramic material by successively placing a plurality of ceramic layers on top of each other followed by sintering this combination to an integral body, one of the layers forming a diaphragm.

U.S. Pat. No. 3,611,797 discloses a strain gauge transducer comprising an annular housing spanned by a strip supporting a strain gauge assembly.

SUMMARY OF THE INVENTION

It is a principal object of the invention to provide a pressure sensor having pressure transmission capability of simple design and cost effective manufacture.

It is a further object of the present invention to provide an easy and cost effective method for producing a pressure sensor having pressure transmission capability.

DESCRIPTION OF THE PREFERRED EMBODIMENTS

Figure 1:
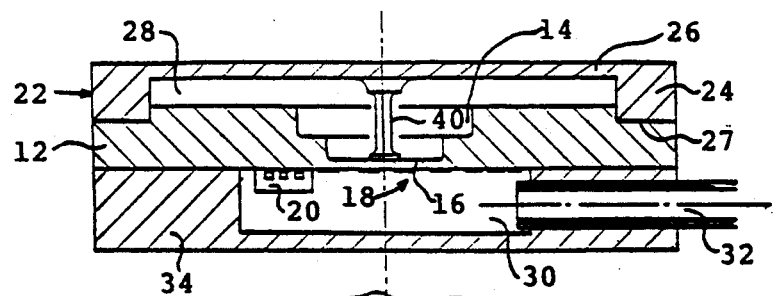
FIG. 1 is a vertical sectional view of a first embodiment of a pressure sensor of the invention.
Figure 2:
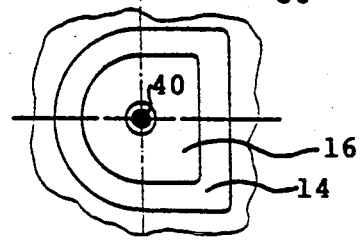
FIG. 2 is a plan view of an inner central region of the pressure sensor of FIG. 1.

Referring to FIGS. 1 and 2 the pressure sensor of the first embodiment comprises a disk-type base part 12 having a central opening 14 which may have a stepped form and the narrower end side of which being spanned by a relatively thin diaphragm 16. According to the invention base part 12 is formed of ceramic material integral with diaphragm 16.

FIG. 2 illustrates an exemplary form of opening 14 and diaphragm 16, respectively. With the illustrated embodiment an approximately semicircular form was chosen.

At the end of base part 12 opposite to diaphragm 16 there is provided spacedly apart a further diaphragm 26 integrally spanning over a torsion ring 24 whose outer diameter corresponds to that of base part 12. Pressure receiving part 22 formed by torsion ring 24 and diaphragm 26 preferably is formed of ceramic material as well. A distance member, preferably a distance stud 40 is formed of ceramic at diaphragm 16, preferably centrally, or is inserted between diaphragms 16 and 26 when made of metal or other heat resistant material.

Since pressure receiving part 22 and base part 12 are made of ceramic, they may be sintered together upon joining at annular contact surface 27. Alternatively, the two parts may be connected together after separate sintering by adhesive or the like.

It should be noted, that further diaphragm 26 has a considerably larger diameter than diaphragm 16. This means that a slight deformation of further diaphragm 26 upon pressure application will result in a considerably larger deformation, when considered in relation to the diameter, of diaphragm 16, despite the fact that due to stud 40 diaphragm 16 is deformed by the same distance as further diaphragm 26. Consequently, a practically friction-free considerable pressure transmission is achieved permitting measurements of small pressures with high accuracy. Furthermore, for high pressures diaphragm 16 may be formed rather stable in view of the smaller area necessary.

For pressure measurement diaphragm 16 may be provided at its exterior surface with a known strain gauge bridge 18, preferably in the form of thickfilm resistors. Bridge circuit 18 may be connected to a data capturing/evaluation circuit 20, preferably provided on the bottom side of base part 12.

The region comprising diaphragm 16 and capturing/evaluation circuit 20 may be formed as an inner space 30 of a cover 34 attached to the bottom side of base part 12 with a tube 32 connecting otherwise closed inner space 30 with atmospheric pressure or, if desired, with a predetermined lower or higher pressure.

It may be appreciated, that the pressure sensor of the invention is of extremely simple design and may be produced in a cost saving manner, in particular in accordance to the following method:

1. Forming base part 12 of ceramic powder as $Al_2O_3$;
2. forming of pressure receiving part 22 of ceramic powder and forming or incorporating of stud 40 thereto;
3. combining base part 12 and pressure receiving part 22 by high temperature sintering;
4. forming of cover 34 of ceramic material including enclosure of tube 32 and subsequent sintering;
5. applying resistor bridge 18 onto diaphragm 16 and capturing/evaluation circuit 20 to bottom surface of base part 12; and
6. fixing cover 34 to the bottom side of base part 12.

Appropriate materials and sintering temperatures may be gathered, for example, from U.S. Pat. No. 4,864,271.

Combining steps 5 and 6 is of particular advantage. By means of thickfilm screen printing not only the bridge resistors may be applied to the bottom side of base part 12, but also conducting paths may be applied in the same manner by coating paste-like soldering tin, f. i. as a mixture of tin in vaporizable organic synthetic material into which the legs of corresponding amplifier elements, resistors, and integrated circuits may be dipped. Preferably, the contact surface between base part 12 and cover 34 may be provided with such a tin paste. As an alternative to the enclosing of tube 32 by sintering, as indicated above, the latter may be inserted into a preformed opening into cover 34 during this process after correspondingly coating of soldering paste thereto.

After assembly of the combination comprising base part 12, pressure receiving part 22 with the cover 34 attached to bottom side of base part 12, this unit is placed into a stove and heated to a temperature below 250° C., preferably below 150° C., where the soldering tin melts and the organic synthetic material eventually contained therein is evaporated. Since this temperature is considerably lower than the sintering temperature the electrical elements applied to the bottom sides of base part 12 are not damaged, whilst by the soldering process an electrically stable connection is formed between these parts and a stable sealed connection is formed at contact surfaces between base part 12 and cover 34.

Alternatively, step 6 may be performed by applying adhesives to base part 12 and cover 34, preferably by placing a synthetic adhesive foil between the contact surfaces.

It should be noted that appropriate output leads as well as supply lines for the capturing/evaluation circuit 20 and the resistor bridge 18 may be passed through tube 32.

In view of the considerably larger relative deformation of diaphragm 16 (in relation to its diameter), as compared with the relative deformation of further diaphragm 26, a considerable change in resistance is caused in resistor bridge 18. This means that even small pressures acting on further diaphragm 26 may be accurately measured by resistor bridge 18.

Figure 3:
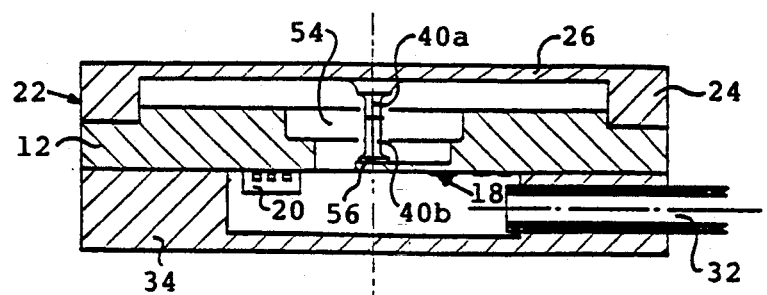
FIG. 3 is a vertical sectional view of a second embodiment of a pressure sensor of the invention.
Figure 4:
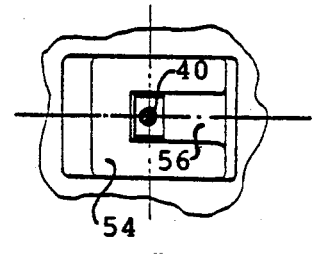
FIG. 4 is a plan view of an inner central region of the pressure sensor of FIG. 3.

FIGS. 3 and 4 illustrate a second embodiment of the invention similar to that of FIGS. 1 and 2 with a different design of the inner diaphragm and the opening.

As may particularly be gathered from FIG. 4, opening 14 of the first embodiment is replaced by a rectangular opening 54 with this embodiment. However, of importance is the exchange of diaphragm 16 (FIGS. 1 and 2) by a one-sided supported tongue 56.

The opposite free end thereof engages or is connected to distance stud 40 which may be in a two part form with an upper portion 40a fixed to the inner side of further diaphragm 26 and a lower portion 40b formed or fixed to the upper side of tongue 56.

The lower side of tongue 56 or preferably the transition thereof into base part 12 is provided with resistor bridge 18. Specifically, this transition responds particularly sensitive to the maximum bending there.

Figure 5:
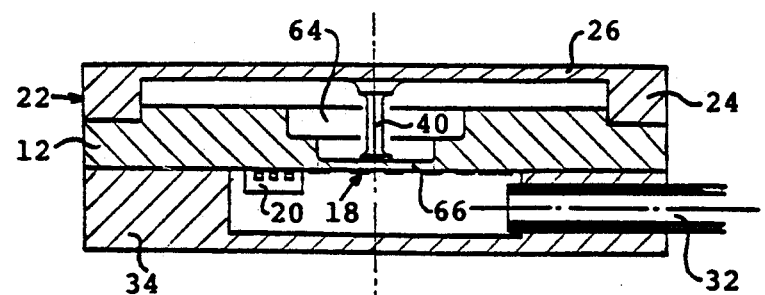
FIG. 5 is a vertical sectional view of a third embodiment of a pressure sensor of the invention.
Figure 6:
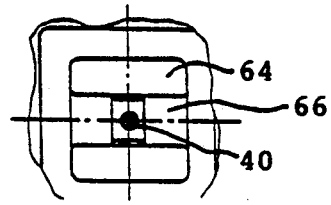
FIG. 6 is a plan view of an inner central region of the pressure sensor of FIG. 5.

Similarly, FIGS. 5 and 6 illustrate the third embodiment of the invention, with diaphragm 16 of the first embodiment being replaced by a square-type opening 64 spanned by a narrow strip 66 again engaged by stud 40. The bottom side of strip 66 has applied thereto resistor bridge 18.

With the preferred embodiments explained above, as a pressure transducer a strain gauge bridge is used. However, the invention is not restricted to such a bridge. With appropriate modification any other type of pressure transducer may be used. As an example, a capacitive pressure transducer may be used comprising surface-type electrodes provided at the outer surface of diaphragm 16 and having opposed thereto electrodes applied to a plate arranged at a small distance from diaphragm 16.

It should be noted that with the first embodiment according to FIGS. 1 and 2 space 28 may be provided with a gas cushion, whilst with the other embodiments spaces 28 and 30 are connected and may have applied thereto the pressure existing at the outer end of tube 32.

Such an hermetically sealed pressure sensor may be lowered by means of tube 32 into a tank for measuring the static pressure of the liquid contained therein. Due to the high transmission pressure differences even in the order of 1/1000 bar may still be measured accurately. Therefore, a permanent consumption measurement may be performed and displayed on a corresponding indicating device or outputted to an evaluation device arranged at a remote location. Since the pressure sensor is fixed to tube 32, no separate mounting within the tank is necessary. Furthermore, tube 32 protects the electrical lines extending from the capturing/evaluation circuit 20 to the exterior and the pressure sensor may be set to different levels of the tank.

From the foregoing it will be appreciated that the design according to the invention results in a pressure sensor responsive even to very low pressures. Therefore, such a pressure sensor is adapted for many applications, specifically for pressure measurements and for mass determination in liquid tanks, with a specific example being fuel tanks of motor vehicles. Of course, the pressure sensor of the invention may be used for measurements of vertical forces acting onto further diaphragm 26, if the pressure sensor is appropriately fixed in its position.

Furthermore, a skilled person will appreciate that measurement of very high pressures is possible as well when inverting the diameters of the two diaphragms.

I claim:

1. A pressure sensor having pressure transmission capability comprising:
   a disk-type base part having a preferably central opening at one end of which there is provided integrally with said base part a surface-type pressure transducer having a first pressure effective area, wherein said surface-type pressure transducer comprises a first diaphragm spanning over said opening in said base part;
   a pressure receiving part including a second diaphragm extending essentially in parallel at a distance from a second end of said opening opposite to said first end thereof and formed integrally at a rigid ring having about the same peripheral dimension on the disk-type base part and being connected thereto, said second diaphragm having a considerably larger pressure-effective area than said pressure transducer; and
   distance means arranged between said second diaphragm and said pressure transducer normal thereto and transmitting a deformation of said second diaphragm completely to said pressure transducer.

2. A pressure sensor having pressure transmission capability comprising:
   a disk-type base part having a preferably central opening at one end of which there is provided integrally with said base part a surface-type pressure transducer having a first pressure effective area;
   a pressure receiving part including a diaphragm extending essentially in parallel at a distance from a second end of said opening opposite to said first end thereof and formed integrally at a rigid ring having about the same peripheral dimensions as the disk-type base part and being connected thereto, said diaphragm having a considerably larger pressure-effective area than said pressure transducer; and
   distance means arranged between said diaphragm and said pressure transducer normal thereto and transmitting a deformation of said diaphragm completely to said pressure transducer, wherein said base part and said pressure receiving part are made of ceramic material.

3. The pressure sensor of claim 2, wherein said cover is made of ceramic material.

* * * * *